US010427877B2

United States Patent
Geysen

(10) Patent No.: US 10,427,877 B2
(45) Date of Patent: Oct. 1, 2019

(54) CONVEYOR BELT SYSTEM

(71) Applicant: Clean Conveyor Belt BVBA, Herselt (BE)

(72) Inventor: Alex Jean Geysen, Herselt (BE)

(73) Assignee: CLEAN CONVEYOR BELT BVBA, Herselt (BE)

( * ) Notice: Subject to any disclaimer, the term of this patent is extended or adjusted under 35 U.S.C. 154(b) by 0 days.

(21) Appl. No.: 15/913,313

(22) Filed: Mar. 6, 2018

(65) Prior Publication Data

US 2018/0251306 A1  Sep. 6, 2018

(30) Foreign Application Priority Data

Mar. 6, 2017 (BE) .................................. 2017/5136

(51) Int. Cl.
| | |
|---|---|
| *B65G 15/60* | (2006.01) |
| *B65G 21/10* | (2006.01) |
| *B65G 45/10* | (2006.01) |
| *B65G 21/08* | (2006.01) |
| *B65G 15/28* | (2006.01) |

(Continued)

(52) U.S. Cl.
CPC ............ *B65G 15/28* (2013.01); *B65G 15/60* (2013.01); *B65G 21/00* (2013.01); *B65G 21/08* (2013.01); *B65G 21/10* (2013.01); *B65G 21/2081* (2013.01); *B65G 23/04* (2013.01); *B65G 39/12* (2013.01); *B65G 45/10* (2013.01); *B65G 47/22* (2013.01); *B65G 69/181* (2013.01);
(Continued)

(58) Field of Classification Search
CPC .... B65G 45/10; B65G 45/26; B65G 21/2072; B65G 21/2081; B65G 47/22
USPC .................................... 198/493, 836.1, 836.3
See application file for complete search history.

(56) References Cited

U.S. PATENT DOCUMENTS

| | | | | | |
|---|---|---|---|---|---|
| 4,674,626 | A | * | 6/1987 | Adcock | ................. B65G 15/60 198/720 |
| 5,458,230 | A | * | 10/1995 | Balcar | ................ B65G 21/2081 198/836.1 |

(Continued)

FOREIGN PATENT DOCUMENTS

| | | |
|---|---|---|
| EP | 1123880 A1 | 8/2001 |
| EP | 2944587 A1 | 11/2015 |

(Continued)

OTHER PUBLICATIONS

BE Search Report, dated Nov. 22, 2017, from corresponding BE application No. 2017/5136.

*Primary Examiner* — James R Bidwell
(74) *Attorney, Agent, or Firm* — Young & Thompson

(57) ABSTRACT

A conveyor belt system includes a frame with a conveyor belt driven by at least two rollers so that an upper belt functions as transport surface and a lower belt functions as return, wherein the frame has an upper segment extending substantially above the upper belt and a lower segment extending substantially under the upper belt, wherein the upper segment has at least two upper standing walls with a mutual spacing which, at least at the position of the upper belt, is smaller than the width of the conveyor belt, and wherein the lower segment has at least two lower standing walls with a mutual spacing which is greater than the width of the conveyor belt, wherein the upper belt is supported on either side by a plate extending respectively from below the upper belt to an outer side of the lower standing wall.

18 Claims, 2 Drawing Sheets

(51) Int. Cl.
*B65G 21/00* (2006.01)
*B65G 39/12* (2006.01)
*B65G 23/04* (2006.01)
*B65G 47/22* (2006.01)
*B65G 21/20* (2006.01)
*B65G 69/18* (2006.01)

(52) U.S. Cl.
CPC .............. *B65G 2201/04* (2013.01); *B65G 2812/02148* (2013.01); *B65G 2812/02168* (2013.01)

(56) References Cited

U.S. PATENT DOCUMENTS

| | | | |
|---|---|---|---|
| 5,513,743 A * | 5/1996 | Brink | B65G 21/2081 198/836.1 |
| 6,293,389 B1 | 9/2001 | Knapp et al. | |
| 6,681,921 B1 * | 1/2004 | Schroeder | B65G 19/08 198/493 |
| 9,440,794 B2 | 9/2016 | Geysen | |
| 9,682,646 B2 * | 6/2017 | Hazelton | A01B 71/08 |

FOREIGN PATENT DOCUMENTS

| | | |
|---|---|---|
| JP | S54-122578 A | 9/1979 |
| JP | S61-44409 U | 3/1986 |
| JP | H09-77227 A | 3/1997 |
| JP | 2004-051338 A | 2/2004 |

* cited by examiner

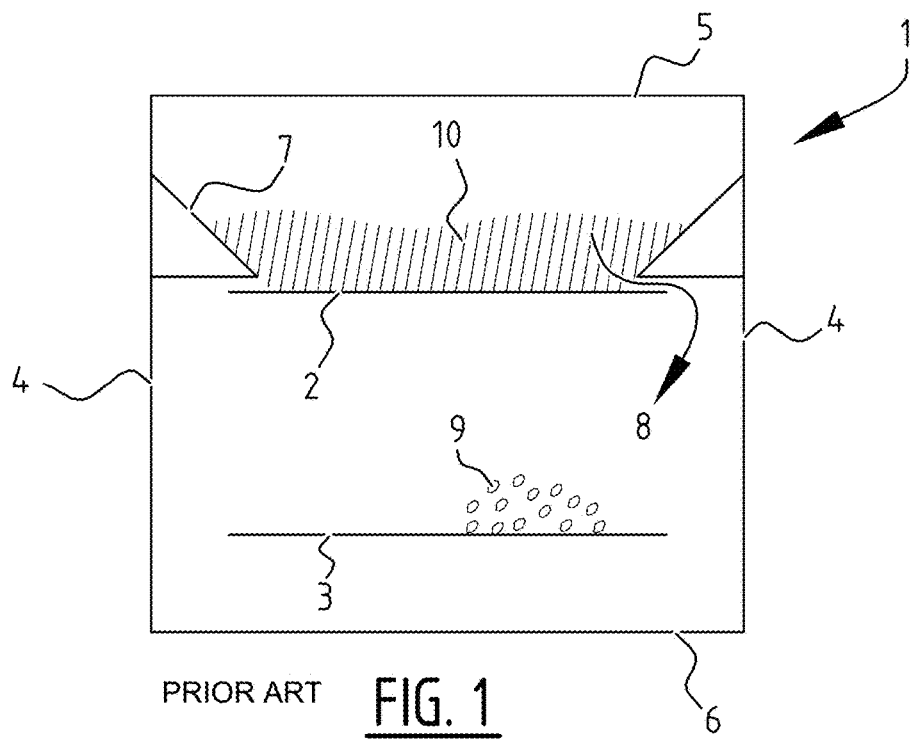
PRIOR ART FIG. 1
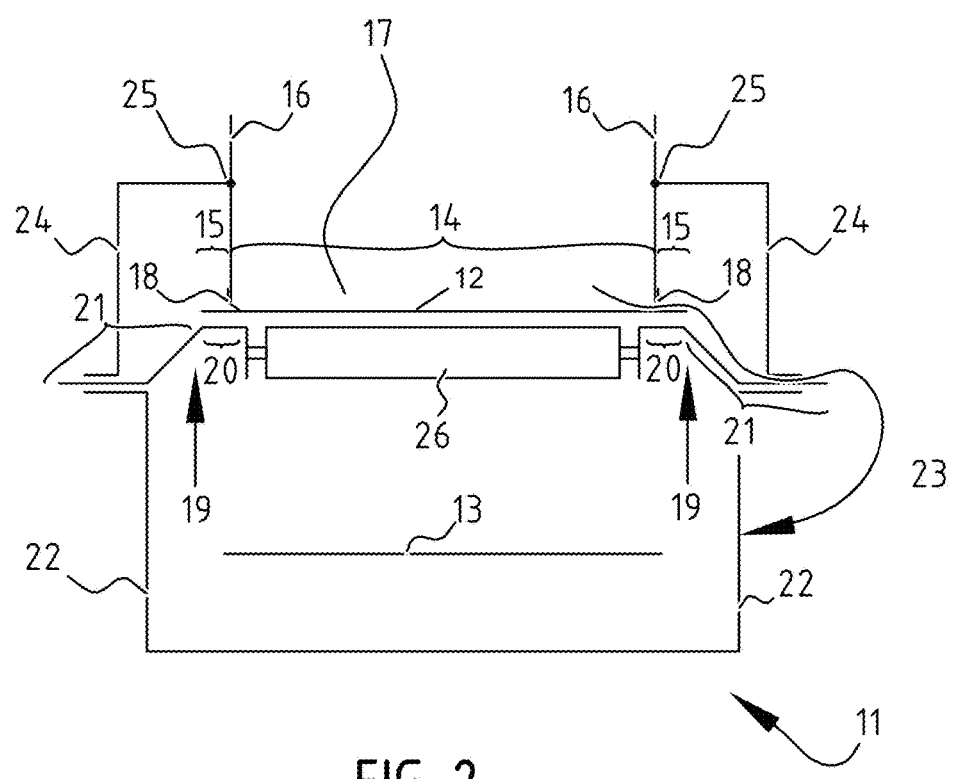
FIG. 2

CONVEYOR BELT SYSTEM

BACKGROUND OF THE INVENTION

Field of the Invention

The invention relates to a conveyor belt system comprising a frame with a conveyor belt which is provided so as to be driven by at least two rollers so that the upper belt functions as transport surface and the lower belt functions as return.

Conveyor belts are much used to move materials between a first location and a second location. The invention relates particularly here to conveyor belts which are adapted to transport bulk materials, also known as bulk cargo or bulk goods. These are materials which are not packed individually and loaded and transported, such as containers, pallets or boxes, but which are deposited in bulk in a loading space, processed and transported. The invention is more particularly optimized for the transport of bulk materials with fine particles. Examples hereof are sand, powder, glass dust. Where the word 'materials' is used in the remainder of the description, this is understood to mean bulk materials as described above. The materials comprise multiple particles, grains or particulate.

For the transport of materials a conveyor belt is provided with upper standing walls with a mutual spacing which at least at the position of the upper belt is smaller than the width of the conveyor belt. The materials are held in place between the upper standing walls and are supported by the upper belt, which then functions as transport surface for transporting the materials from the infeed of the conveyor belt to the outfeed of the conveyor belt. An operating zone is hereby defined on the conveyor belt between the standing walls. It is impossible, particularly when the materials comprise small particles, to hold all particles between the upper standing walls. The particles which come to lie outside the operating zone, for instance by moving under the upper standing walls, form contaminants which can adversely affect the operation of the conveyor belt.

Description of the Related Art

In most conventional conveyor belt systems it is not possible to prevent such contaminants fouling the interior of the conveyor belt system. A typical problem occurs when the contaminants come to lie on the lower belt functioning as return. These contaminants then come to lie on an inner side of the conveyor belt where they foul the two rollers and other drive and guide elements in the conveyor belt. This will ultimately cause increased wear or even blockage of the conveyor belt system. Much attention is therefore focused in conventional conveyor belt systems on the seal between the upper standing walls and the conveyor belt. This sealing is optimized in order to minimize leakage and the adverse consequences thereof.

EP 2 944 587 describes a conveyor belt system which provides an improved solution to the above described problem. A standard conveyor belt system has a frame and the conveyor belt protrudes on either side through the walls of the frame so that the sides of the conveyor belt are situated outside the frame. Because the conveyor belt lies with its edges outside the frame, contaminants falling via the side of the conveyor belt will not come to lie inside the frame. The structure of the construction prevents with certainty the possibility of contaminants coming into contact with drive elements located in the frame of the conveyor belt system. This considerably reduces the chance of wear and/or blockage of the conveyor belt.

BRIEF SUMMARY OF THE INVENTION

It is an object of the invention to provide a conveyor belt system with a similarly reduced chance of wear and/or blockage, and with an alternative construction.

The invention provides for this purpose a conveyor belt system comprising a frame with a conveyor belt which is provided so as to be driven by at least two rollers so that an upper belt functions as transport surface and a lower belt functions as return, wherein the frame has an upper segment extending substantially above the upper belt and a lower segment extending substantially under the upper belt, wherein the upper segment has at least two upper standing walls with a mutual spacing which, at least at the position of the upper belt, is smaller than the width of the conveyor belt, and wherein the lower segment has at least two lower standing walls with a mutual spacing which is greater than the width of the conveyor belt, wherein the upper belt is supported on either side by a plate extending respectively from below the upper belt to an outer side of the lower standing wall.

The conveyor belt system according to the invention provides a plate under the edges of the upper belt of the conveyor belt. This plate extends to an outer side of the lower standing wall. The lower standing wall forms the lower segment of the frame extending substantially below the upper belt. The lower standing walls have a mutual spacing which is greater than the width of the conveyor belt. Contaminants which move over the edge of the conveyor belt come to lie on the plate. When these contaminants move further on the plate, for instance as a result of the operation of the conveyor belt, as a result of the vibrations, as a result of the accumulation of contaminants, the contaminants will eventually drop from the plate on an outer side of the lower standing walls. Because the distance between the outer lower walls is greater than the width of the conveyor belt, the conveyor belt is situated between or inside these lower standing walls. Because the plate carries the contaminants to an outer side of the lower standing walls, these contaminants cannot reach the lower belt, since it lies inside the lower standing walls. By providing a conveyor belt with a plate on either side at the position of the upper belt contaminants can be diverted to a location where contaminants cannot impair the operation of the conveyor belt. Hereby provided is an alternative construction for the conveyor belt system wherein the conveyor belt extends on either side outside the frame, with a similarly reduced chance of wear and/or blockage.

The plate preferably has a first segment for supporting the upper belt and a second segment for discharging contaminants. The second segment more preferably drains at least partially in a direction away from the conveyor belt. The upper side of the plate, at least at the position of the second segment, is more preferably at least partially free of obstructions so that contaminants can move over the plate from the first segment to an outer edge of the plate. By having the plate drain in a direction away from the conveyor belt contaminants will tend more to move to the outer edge of the plate situated on an outer side of the lower standing walls.

The plate is preferably in two parts, and each part is located on either side of the upper belt. By making the belt in two parts, wherein one part is placed in each case on one transverse side of the conveyor belt, the friction between the plate and the conveyor belt is optimized. Elements for supporting, guiding or driving the conveyor belt can further be provided between the plates in order to support a central zone of the upper belt. Guide rollers are preferably provided between the two parts of the plate to support the upper belt in a central zone thereof.

The upper standing walls are preferably provided with a seal at the position of the conveyor belt so that materials on the conveyor belt are confined between the upper standing walls. The seal reduces the quantity of particles which can move outside the operating zone of the conveyor belt. The operating zone is defined here as the area on the upper belt which functions as transport surface, and between the two upper standing walls. This operating zone is intended for the purpose of carrying and guiding the materials during transport from the infeed to the outfeed of the conveyor belt. Leakage is minimized by the seal.

Pressure difference means are preferably provided in order to realize a pressure difference over the seal so that leakage via the seal is minimal. The pressure difference means can be configured to apply underpressure in the operating zone relative to the spaces behind the seal. The pressure difference means can alternatively realize an increased pressure on an outer side of the seal. In both cases an airflow from an outer side of the seal to the operating zone of the conveyor belt will be created by the pressure difference so that particles present at the position of the seal tend as a result of the airflow to move to the operating zone of the conveyor belt. This further minimizes leakage.

The seal is preferably provided, in the transverse direction of the conveyor belt, on either side above the first segment of the plate. The first segment of the plate is situated below the edge of the conveyor belt. The first segment of the plate hereby supports the conveyor belt at the position of the edge. By positioning the seal at the position of the first segment of the plate the seal can be configured to exert a pressure on the conveyor belt, this pressure being directly absorbed by the plate. The contact between the plate and the conveyor belt is hereby improved on the one hand and the sealing improved on the other. It is noted in this context that increasing the pressure also entails increasing the resistance, so that the skilled person must seek a balance between an acceptable sealing and an acceptable resistance. This can be done by the skilled person on the basis of the situation.

The lower standing walls preferably extend to a height below the lower belt. Contaminants dropping from the plate on an outer side of the lower standing walls cannot come to lie on the lower belt when the lower standing walls extend to a height below the lower belt.

The upper segment preferably comprises a roof element which extends between the two standing walls in order to enclose the transport surface. The roof element further provides for screening of the operating zone of the conveyor belt so that materials cannot be blown up from the conveyor belt due to the ambient wind influence.

The conveyor belt is preferably situated substantially centred in the transverse direction relative to at least one of the two upper standing walls and the two lower standing walls and the plate. The upper standing walls, the plate and the lower standing walls more preferably extend over a length substantially equal to the length of the upper belt of the conveyor belt. The conveyor belt is hereby adapted along substantially its whole length to guide contaminants away from the conveyor belt system. Support elements are more preferably provided under the lower belt.

BRIEF DESCRIPTION OF THE DRAWINGS

The invention will now be further described on the basis of an exemplary embodiment shown in the drawing.

In the drawing:

FIG. 1 shows a cross-section of a prior art conveyor belt;

FIG. 2 shows a cross-section of a conveyor belt according to a first embodiment of the invention.

The same or similar elements are designated in the drawing with the same reference numeral.

DETAILED DESCRIPTION OF THE PREFERRED EMBODIMENTS

Figure 3:
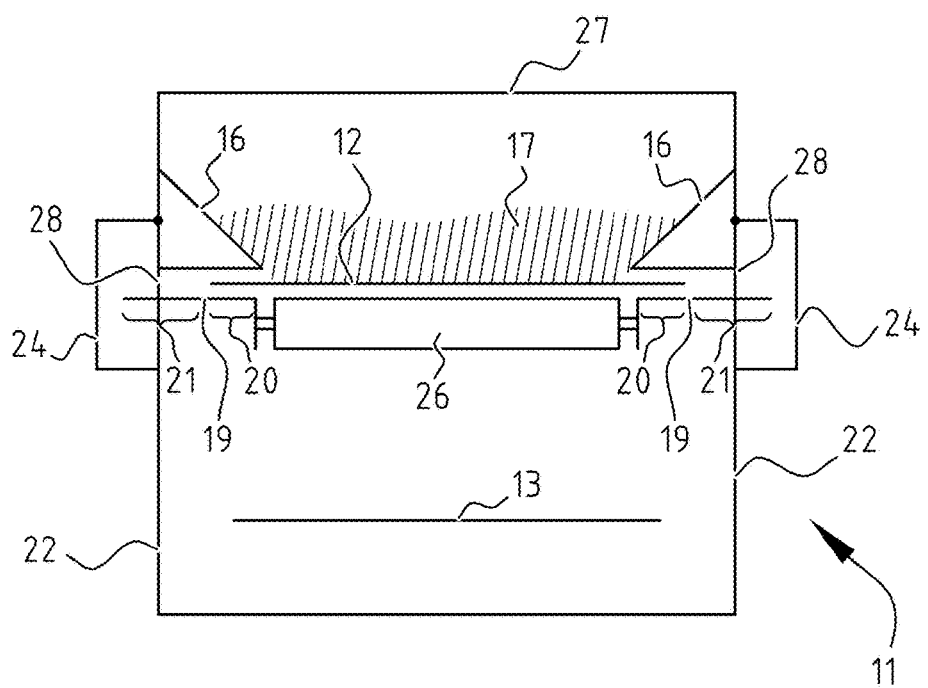
FIG. 3 shows a cross-section of a conveyor belt according to a second embodiment of the invention.

FIG. 1 shows a traditional conveyor belt 1 according to the prior art. Conveyor belt 1 is shown in cross-section, wherein the cross-section is through a central part of the conveyor belt. FIG. 1 shows an upper belt 2 and a lower belt 3. A conveyor belt is formed as an endless belt which forms upper belt 2 and lower belt 3 and which is typically tensioned over two rollers. At least one of these two rollers is typically provided here as drive roller for driving the conveyor belt. The upper belt and lower belt are typically further supported and/or guided by further rollers, slots or other support elements.

Conveyor belts can be made in different sizes with different lengths and widths and can be optimized for transport of various types of material. The invention relates particularly to the transport of bulk materials. The invention is more specifically optimized for bulk materials with small particles. Bulk materials are typically deposited onto the conveyor belt at a beginning of the conveyor belt. Conveyor belt 1 typically has for this purpose an open upper side at a beginning. At an end of the conveyor belt the bulk materials typically drop off the belt. At the end of the conveyor belt the conveyor belt will therefore be open at the bottom so that the bulk materials can drop off the belt. A scraper can be provided here at the end of the conveyor belt, at the position of the roller over which the conveyor belt runs, to urge a maximum of the bulk materials to drop off the conveyor belt. Such a construction and the described mechanisms are known and can also be applied in the conveyor belt according to the invention.

FIG. 1 shows a cross-section of a middle part of a traditional conveyor belt 1. The conveyor belt has an operating zone 10. The operating zone is defined by upper belt 2, which functions as transport surface, and the upper standing walls 7. Upper standing walls 7 are placed above upper belt 2 and with a mutual spacing, at least at the position of upper belt 2, which is smaller than the width of upper belt 2. Upper standing walls 7 will hereby function as guide or stop for the bulk materials in order to hold the materials within operating zone 10 of the conveyor belt.

Conveyor belt 1 further has two standing walls 4 which screen the conveyor belt from the surrounding area. Ambient influences are also excluded from the conveyor belt by standing walls 4. It will be apparent in this context that different operating elements of conveyor belt 1, for instance guide elements, drive elements and so on, are preferably screened off from the surrounding area. It can also be advantageous to keep ambient influences such as dirt, water, wind and so on away from these operating elements of conveyor belt 1.

In FIG. 1 conveyor belt 1 is further provided with an upper wall 5 which also covers the operating zone 10 of the conveyor belt. Just as the two standing walls 4, this covering functions in two directions. On the one hand the surrounding area is screened off from the materials on the conveyor belt. This is relevant for instance when the bulk materials have very fine particles which can be blown about and thereby foul the surrounding area. On the other hand upper wall 5 screens the operating zone 10 from ambient influences such as wind, water, dirt etc. In FIG. 1 conveyor belt 1 is further provided with a lower wall 6. Lower wall 6 is optional and can be formed by a plate or by a floor on which conveyor belt 1 is placed.

When materials are placed on upper belt 2 within operating zone 10 of conveyor belt 1, the materials are preferably held as far as possible within this operating zone 10. Much attention is hereby devoted in practice to the seal between upper standing walls 7 and upper belt 2. It is almost impossible in practice to prevent leakage 8. Leakage 8 occurs when particles of the materials leave operating zone 10 via the seal between upper standing walls 7 and upper belt 2. When they leave operating zone 10, these particles become contaminants. It is noted for the sake of clarity that, when the particles are located within operating zone 10, these particles form part of the materials and are not deemed contaminants. When these particles find their way out of operating zone 10, these particles are deemed as contaminants and no longer form part of the materials. The location of the particle hereby determines whether the particle is deemed as part of the materials or as contaminant. The particles which leave operating zone 10 and thereby form contaminants will in practice often drop off the edge of upper belt 2. This is indicated in FIG. 1 with arrow 8, which illustrates the leakage. Because of the construction of the prior art conveyor belt 1 contaminants can come to lie on lower belt 3, this being indicated in FIG. 1 with reference numeral 9. These contaminants can here cause fouling 9 and/or accumulation 9 which is detrimental to conveyor belt 1. These accumulations 9 can increase wear of the conveyor belt and eventually result in blockage of conveyor belt 1. It is found in practice that removal of accumulations 9 in a conveyor belt as illustrated in FIG. 1 is very difficult and labour-intensive.

FIG. 2 shows a conveyor belt system 11 according to the invention. Just as FIG. 1, FIG. 2 shows a cross-section of a central part of conveyor belt system 11. Conveyor belt system 11 comprises an upper belt 12 and a lower belt 13 which extend in conventional manner from a first roller to a second roller (not shown) at respectively the beginning and the end of the conveyor belt. Upper belt 12 and lower belt 13 form the conveyor belt, which is formed as endless belt and which can be mounted in traditional manner around two rollers. At a start zone where materials are loaded onto the conveyor belt and at an end zone where materials are removed from the conveyor belt the conveyor belt system 11 preferably has a traditional construction. That is, drive elements and provisions for loading and unloading materials onto and from transport system 11 take a traditional form. In a central zone extending between the start zone and the end zone of conveyor belt system 11 the conveyor belt system 11 is embodied as described below with reference to FIGS. 2 and 3. The mechanisms and components shown in FIGS. 2 and 3 preferably extend substantially over the whole length of conveyor belt system 11 between the start zone and the end zone thereof Upper belt 12 has as seen in transverse direction a central zone 14 and two edge zones 15, also referred to below as edges 15. Central zone 14 forms the transport surface of the conveyor belt system. Edges 15 extend on either side of central zone 14. The separation between central zone 14 and edges 15 is preferably defined by upper standing walls 16. Upper standing walls 16 form guides for the materials on the transport surface for the purpose of holding the materials within an operating zone 17 of conveyor belt system 11. Operating zone 17 preferably extends above the central zone 14 forming the transport surface so that materials on operating zone 17 can be transported from a beginning of conveyor belt system 11 to the end of conveyor belt system 11. Upper standing walls 17 are intended here for the purpose of holding the materials within operating zone 17.

Seals 18 are preferably provided between upper belt 12 and upper standing walls 16. Seals 18 increase the barrier or resistance to the materials in operating zone 17 moving to edges 15 of upper belt 12. Seals 18 can be formed in different ways, for instance by brushes, rubbers, felts or other known barrier mechanisms or sealing elements. Seals are known and not therefore discussed further.

Conveyor belt system 11 further comprises a plate 19. Plate 19 extends in the transverse direction of conveyor belt system 11 from below upper belt 12 to an outer side of the frame of conveyor belt system 11. In the embodiment of FIG. 2 a plate 19 is provided on either side of upper belt 12. Each plate 19 here has a first segment 20 and a second segment 21. First segment 20 is provided for the purpose of lying under upper belt 12. First segment 20 preferably lies at least under edges 15 of upper belt 12. Plates 19 hereby support upper belt 12 at the position of the edges. In the embodiment of FIG. 2 support rollers 26 extend between plates 19 in order to support central zone 14 of upper belt 12. The skilled person will appreciate that this is only one embodiment and that more ways of supporting upper belt 12, and more specifically central zone 14 of upper belt 12, can be envisaged. Second segment 21 of plate 19 spans a distance between the outermost edge of upper belt 12 and an outer side of the frame of conveyor belt system 11.

Under upper belt 12 the frame typically comprises lower standing walls 22. Lower standing walls 22 typically have a mutual spacing greater than the width of the conveyor belt so that the space below upper belt 12, preferably including lower belt 13, is encased by lower standing walls 22. The second segments of plates 19 extend to an outer side of lower standing walls 22.

Upper standing walls 16, and more specifically seals 18, are preferably positioned in transverse direction of conveyor belt system 11 above first segment 20 of plate 19. This allows upper belt 12 to be clamped between plate 19, which functions as support for upper belt 12, and seal 18 which defines operating zone 17 of the conveyor belt system. This construction allows a seal to be realized which functions reliably.

The construction of conveyor belt system 11 as shown in FIG. 2 has the effect that contaminants are always carried to an outer side of the frame of conveyor belt system 11. The contaminants cannot therefore accumulate on lower belt 13 as illustrated in FIG. 1.

In order to improve the action of plate 19, second segment 21 of plate 19 preferably takes a form draining in a direction away from upper belt 12. The main purpose of plate 19 is to divert or discharge contaminants to a location outside the frame of conveyor belt system 11. In FIG. 2 the path followed by contaminants is designated with arrow 23. This has also been described above as leakage 23. It will be apparent from FIG. 2 that contaminants cannot drop onto lower belt 13.

In order to further increase hygiene or screening the conveyor belt system 11 can be further provided with a cover 24 which extends at least partially over an upper side of plate 19 on an outer side of upper standing walls 16. Cover 24 can for instance be connected hingedly 25 to upper standing walls 16 so that cover 24 can be opened. Contaminants will accumulate inside cover 24 and can be removed in extremely simple manner by a service engineer.

In the embodiment of FIG. 2 it will be apparent that the upper side of operating zone 17 is not covered. An upper wall, such as upper wall 5 in FIG. 1, can alternatively be provided.

FIG. 3 shows an alternative embodiment of the invention. FIG. 3 shows how the frame is constructed with lower standing walls 22. Lower standing walls 22 extend further upward to a position above upper belt 12 of the conveyor belt. Further upper standing walls 16 are provided above upper belt 12. Upper standing walls 16 extend from lower standing walls 22 to a position above upper belt 12. At the position of upper belt 12 upper standing walls 16 have a mutual spacing smaller than the width of upper belt 12. Elements 16 hereby form the upper standing walls, while walls 22 fulfil the function of the lower standing walls. Plate 19 is further provided under the edges of upper belt 12. Plate 19 extends to an outer side of lower standing walls 22. It will be apparent here that openings 28 are provided in lower standing walls 22 so that contaminants on the plate can move from a peripheral edge of upper belt 12 to an outer side of lower standing walls 22. A cover 24 can further be provided similar to cover 24 of FIG. 2.

The skilled person will appreciate on the basis of the description above that the invention can be embodied in different ways and on the basis of different principles. The invention is not limited to the above described embodiments. The above described embodiments and the figures are purely illustrative and serve only to increase understanding of the invention. The invention will not therefore be limited to the embodiments described herein, but is defined in the claims.

The invention claimed is:

1. A conveyor belt system comprising a frame with a conveyor belt which is provided so as to be driven by at least two rollers so that an upper belt functions as transport surface and a lower belt functions as return, wherein the frame has an upper segment extending substantially above the upper belt and a lower segment extending substantially under the upper belt, wherein the upper segment has at least two upper standing walls with a mutual spacing which, at least at the position of the upper belt, is smaller than the width of the conveyor belt, and wherein the lower segment has at least two lower standing walls with a mutual spacing which is greater than the width of the conveyor belt, wherein the upper belt is supported on either side by a plate extending respectively from below the upper belt to an outer side of the lower standing wall, and wherein the plate has a first segment for supporting the upper belt and a second segment for discharging contaminants.

2. The conveyor belt system as claimed in claim 1, wherein the second segment drains at least partially away from the conveyor belt.

3. The conveyor belt system as claimed in claim 1, wherein the second segment is at least partially screened by a removable cover.

4. The conveyor belt system as claimed in claim 1, wherein the plate is in two parts, and wherein each part is located on either side of the upper belt.

5. The conveyor belt system as claimed in claim 4, wherein guide rollers are provided between the two parts of the plate, which guide rollers support the upper belt in a central zone thereof.

6. The conveyor belt system as claimed in claim 1, wherein the upper standing walls are provided with a seal at the position of the conveyor belt so that materials on the conveyor belt are confined between the upper standing walls.

7. The conveyor belt system as claimed in claim 6, wherein pressure difference means are provided in order to realize a pressure difference over the seal so that leakage via the seal is minimal.

8. The conveyor belt system as claimed in claim 1, wherein the seal is provided, in the transverse direction of the conveyor belt, at the position of the first segment of the plate.

9. The conveyor belt system as claimed in claim 1, wherein the lower standing walls extend to a height below the lower belt.

10. The conveyor belt system as claimed in claim 1, wherein the upper segment comprises a roof element which extends between the two upper standing walls in order to enclose the transport surface.

11. The conveyor belt system as claimed in claim 1, wherein the conveyor belt is situated substantially centered in the transverse direction relative to at least one of the two upper standing walls and the two lower standing walls and the plate.

12. The conveyor belt system as claimed in claim 1, wherein the upper standing walls, the plate and the lower standing walls extend over a length substantially equal to the length of the upper belt of the conveyor belt.

13. The conveyor belt system as claimed in claim 1, wherein support elements are provided under the lower belt.

14. The conveyor belt system as claimed in claim 2, wherein the second segment is at least partially screened by a removable cover.

15. The conveyor belt system as claimed in claim 2, wherein the plate is in two parts, and wherein each part is located on either side of the upper belt.

16. The conveyor belt system as claimed in claim 3, wherein the plate is in two parts, and wherein each part is located on either side of the upper belt.

17. The conveyor belt system as claimed in claim 2, wherein the upper standing walls are provided with a seal at the position of the conveyor belt so that materials on the conveyor belt are confined between the upper standing walls.

18. The conveyor belt system as claimed in claim 3, wherein the upper standing walls are provided with a seal at the position of the conveyor belt so that materials on the conveyor belt are confined between the upper standing walls.

* * * * *